US012085190B2

(12) United States Patent
Rühe et al.

(10) Patent No.: US 12,085,190 B2
(45) Date of Patent: Sep. 10, 2024

(54) MEASURING SYSTEM, SLIDE VALVE COMPRISING SUCH A MEASURING SYSTEM, AND METHOD FOR MEASURING THE POSITION OF A SLIDE VALVE

(71) Applicant: Z & J Technologies GmbH, Düren (DE)

(72) Inventors: Andreas Rühe, Kreuzau (DE); Holger Breuer, Hürtgenwald (DE); Alexander Braun, Düren-Kufferath (DE)

(73) Assignee: Z & J Technologies GmbH, Düren (DE)

( * ) Notice: Subject to any disclaimer, the term of this patent is extended or adjusted under 35 U.S.C. 154(b) by 287 days.

(21) Appl. No.: 17/472,125

(22) Filed: Sep. 10, 2021

(65) Prior Publication Data

US 2022/0082179 A1    Mar. 17, 2022

(30) Foreign Application Priority Data

Sep. 11, 2020   (DE) .......................... 102020123770.7

(51) Int. Cl.
*F16K 37/00* (2006.01)
*G01S 13/06* (2006.01)

(52) U.S. Cl.
CPC .......... *F16K 37/0083* (2013.01); *G01S 13/06* (2013.01)

(58) Field of Classification Search
CPC .............................. G01S 13/06; F16K 37/0083
See application file for complete search history.

(56) References Cited

U.S. PATENT DOCUMENTS

| | | | |
|---|---|---|---|
| 752,400 A * | 2/1904 | Kromer | F01B 1/0668 91/13 |
| 9,250,277 B1 * | 2/2016 | Mulhern | G01R 25/06 |
| 2003/0233203 A1 * | 12/2003 | Grumstrup | G05D 16/2095 702/100 |
| 2005/0241391 A1 | 11/2005 | Kull | |

FOREIGN PATENT DOCUMENTS

| | | |
|---|---|---|
| DE | 102013108490 A1 | 2/2015 |
| DE | 102018218150 A1 | 4/2020 |

OTHER PUBLICATIONS

German application No. DE 10 2020 123 770.7, German Search Report dated May 10, 2021, 10 pages.
European Search Report, Application No. EP 21191017, mailed Mar. 15, 2022, 7 pages.

* cited by examiner

*Primary Examiner* — Paul M. West
(74) *Attorney, Agent, or Firm* — Cesari and McKenna, LLP

(57) ABSTRACT

The invention relates to a measuring system for industrial valves, in particular for plants in the fields of chemistry, petrochemistry, iron or steel production, glass production, or energy and environmental technology, for measuring the position of a movable component of the valve, wherein a measuring device for transmitting and receiving radar signals is connected to a probe for guiding the radar signals, wherein a reflective element is guided in the probe and can be coupled to the movable component in such a way that a position of the component corresponds to a position of the reflective element in the probe.

17 Claims, 3 Drawing Sheets

Figure 1:
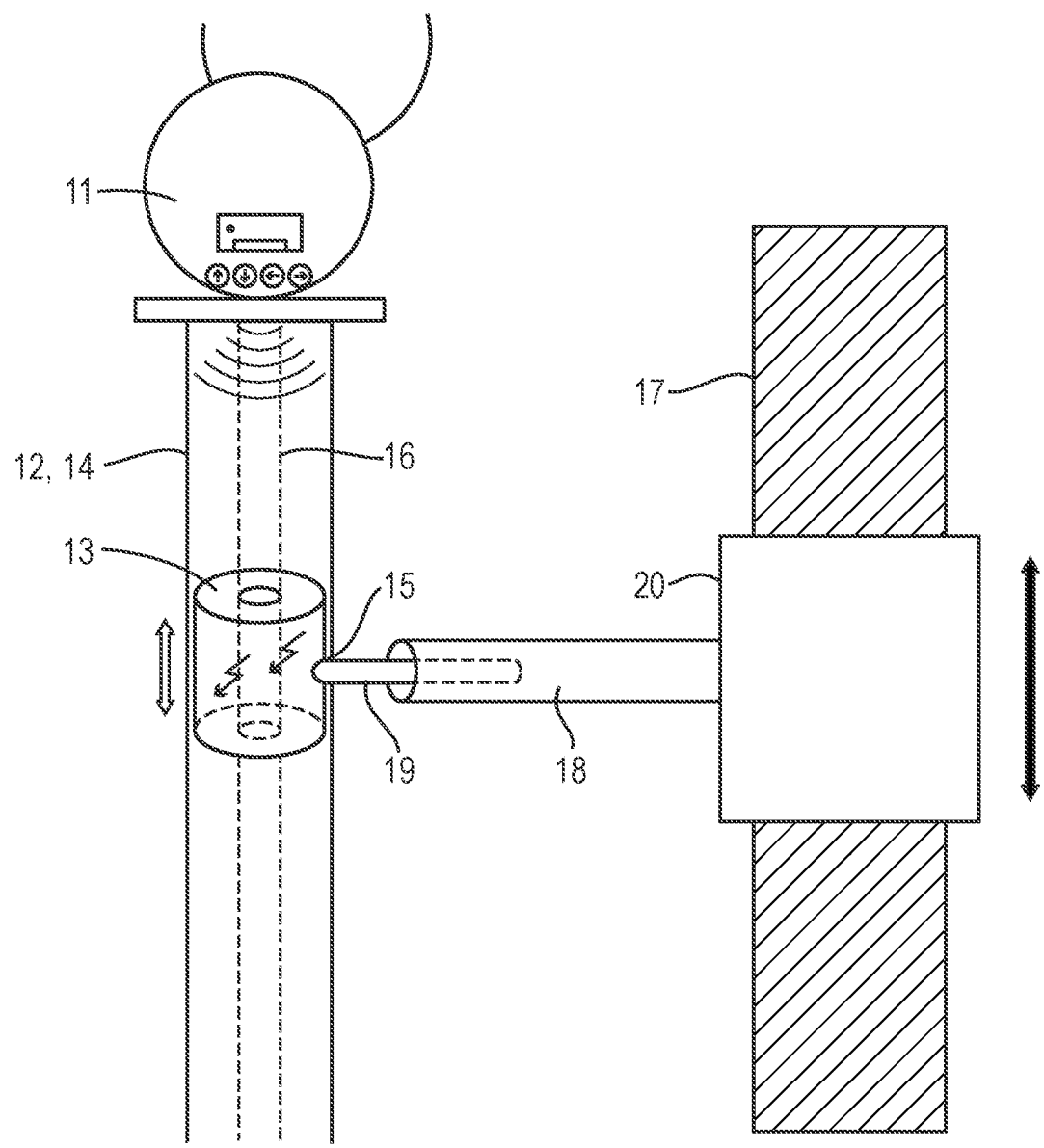

MEASURING SYSTEM, SLIDE VALVE COMPRISING SUCH A MEASURING SYSTEM, AND METHOD FOR MEASURING THE POSITION OF A SLIDE VALVE

CROSS REFERENCE TO RELATED APPLICATIONS

This application claims the benefit of German Patent Application No. 102020123770.7 filed Sep. 11, 2020.

TECHNICAL FIELD

The present disclosure relates to a measuring system for an industrial slide valve, in particular for plants in the fields of chemistry, petrochemistry, iron or steel production, glass production, or energy and environmental technology, for measuring the position of a movable component of the valve.

The invention relates to a measuring system for industrial valves, in particular for plants in the fields of chemistry, petrochemistry, iron or steel production, glass production, or energy and environmental technology, for measuring the position of a movable component of the valve. Measuring systems according to the preamble of claim 1 are known from practice in the form of magnetostrictive measuring systems which are used for measuring the position of moving components in plant construction. The invention further relates to a slide valve comprising such a measuring system and to a method for measuring the position of a slide valve.

In industrial valves, it is often necessary to know the position of linearly moving components, especially slide valves. This involves measuring whether the slide valve is fully closed or fully open or in an intermediate position. The magnetostrictive measuring systems used so far are susceptible to vibrations and can lead to inaccurate results.

The invention is based on the object of providing a measuring system for industrial valves that is designed to be as robust and simple as possible. The invention is also based on the object of providing a slide valve comprising such a measuring system, and a method for measuring the position of a slide valve.

According to the invention, this object is achieved with regard to the measuring system for industrial valves by the subject matter of claim 1. With regard to the slide valve, the object is achieved by the subject-matter of claim 8, and with regard to the method, by the subject matter of claim 10.

Specifically, the object is achieved by a measuring system for industrial valves which are particularly suitable for plants in the fields of chemistry, petrochemistry, iron or steel production, glass production, or energy and environmental technology, wherein the measuring system is adapted for measuring the position of a linearly movable component of the valve. The measuring system has a measuring device for transmitting and receiving radar signals, which device is connected to a probe for guiding the radar signals. A reflective element is guided in the probe and can be coupled to the movable component of the valve in such a way that a position of the component corresponds to a position of the reflective element in the probe.

In other words, a change in the position of the component is transferred to the position of the reflective element in the probe, so that the position of the reflective element in the probe changes accordingly. The position of the reflective element in the probe can be determined by the radar signal reflected at the reflective element. In this way, the position of the component can be inferred. Here, the distance between the measuring device, which sends and receives the radar signals, and the reflective element is changed. The propagation time of the reflected radar signals is recorded and evaluated. The propagation time changes due to the change in distance, whereby the position of the reflective element in the probe and thus the position of the component can be concluded. The measuring device or the measuring system functions according to the principle of time domain reflectometry, also known as guided radar, or TDR for short.

This technology, which is known per se, has the advantage that it is insensitive to vibrations and enables a simple measurement setup.

The measuring system is suitable for measuring linear movements at industrial valves.

Time domain reflectometry is known from electrical engineering for measuring cable lengths or faults in electrical lines. Time domain reflectometry is also used in fill level transducers, i.e. for measuring the fill levels of liquid or bulk material containers. Here, other requirements, such as temperature, density or composition of the materials present in conjunction with the measurement, play a role. The known measuring systems cannot be used readily in plant construction.

Surprisingly, it has been found that modified measuring systems from fill level indicator technology can be used to measure the position of movable components in plant construction and bring advantages with regard to the mechanical loads that occur in plant construction, for example such as vibrations. Specifically, in the context of the invention, the probe is equipped with the reflective element guided therein, which can be coupled to the movable component to detect the position of the latter. The measuring device for transmitting and receiving the radar signals can be adopted from the fill level indicator technology.

Preferred embodiments of the invention are described in the dependent claims.

The reflective element can be adapted to generate a contact, in particular an electrical contact. The contact is permanent here, i.e. continuous during the measurement. This achieves a strong, in particular complete, reflection of the radar signals. During operation, the reflective element changes its position in the probe together with the movable component. The contact region created by the reflective element moves in the probe, so that the change in the distance between the reflective element and the measuring device for transmitting and receiving the radar signals is detected.

In another preferred embodiment, the probe has an outer tube in which the reflective element is guided. This design of the probe is simple and robust.

The outer tube can have a lateral opening, in particular a slot, through which the reflective element can be coupled to the movable component. This allows linear movements of the component that is to be measured to be transmitted and easily detected.

In another embodiment, the probe has a guide element for the reflective element, in particular an inner tube, which is arranged in the outer tube. The reflective element can move along the guide element.

Preferably, the reflective element electrically connects the guide element and the outer tube to create the contact. The guide element has the dual function here of guiding the reflective element in the outer tube on the one hand and creating the electrical contact through the reflective element on the other hand. Other embodiments in which the functions of guiding and contact creation are separated are possible. The present embodiment has the advantage that it is simply constructed and very robust, so that the position of the component can be reliably detected even under difficult conditions.

In another preferred embodiment, the reflective element has an outer diameter that corresponds to the inner diameter of the outer tube. The reflective element has an inner diameter that corresponds to the outer diameter of the guide element. The reflective element is thus arranged flush in the outer tube and additionally lies against the inner tube, whereby on the one hand secure guidance and on the other hand the desired electrical contact is made possible.

The slide valve according to the invention for industrial plants, in particular in the fields of chemistry, petrochemistry, iron or steel production, glass production, or energy and environmental technology, has a measuring system with the features of claim 1. In other words, the slide valve is equipped with such a measuring system. In the slide valve, the movable component is in the form of a slide valve plate which is coupled to the reflective element of the measuring system in such a way that a movement of the slide valve plate can be transmitted to the reflective element. The movement can be transmitted directly or indirectly.

In a preferred embodiment of the slide valve, the slide valve plate has a drive rod, which can be designed, for example, as a drive spindle or drive cylinder. The drive rod is connected to the reflective element. When the slide valve plate is actuated by the drive rod, the latter inevitably changes its position together with the slide valve plate, so that the position of the slide valve plate can be inferred by measuring the position of the drive rod. In the case of the drive spindle, the change in position is equivalent to the number of revolutions of the spindle nut.

In the method according to the invention for measuring the position of a movable component of an industrial valve, in particular for plants in the fields of chemistry, petrochemistry, iron or steel production, glass production or energy and environmental technology, the position of the component is measured according to the principle of time domain reflectometry.

The invention is explained with further details by means of an exemplary embodiment with reference to the attached schematic drawings.

In the drawings

Figure 2:
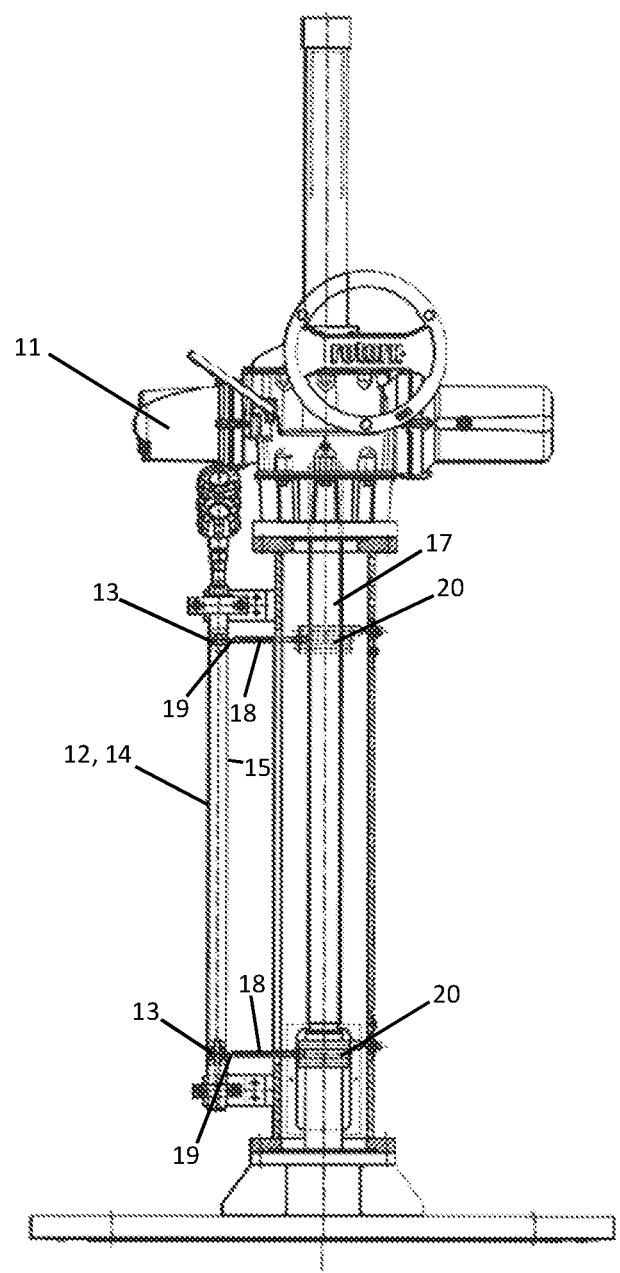
Figure 3:
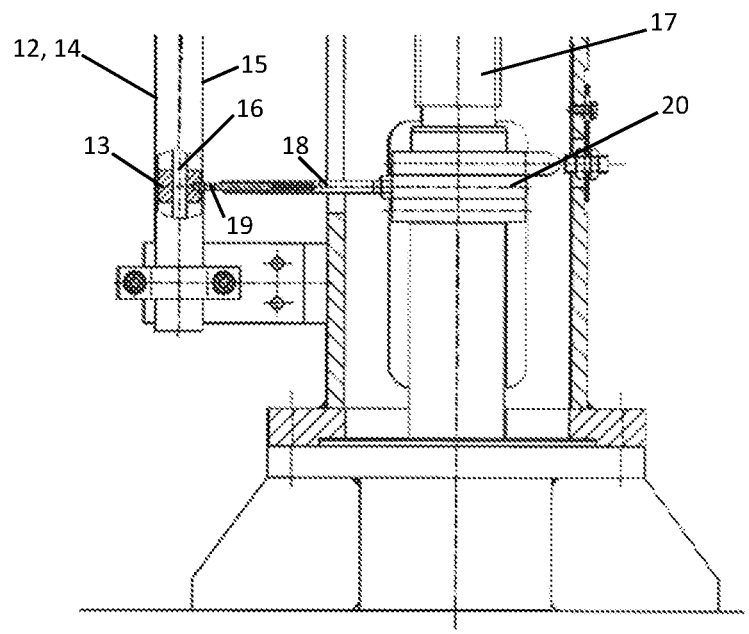
Figure 4:
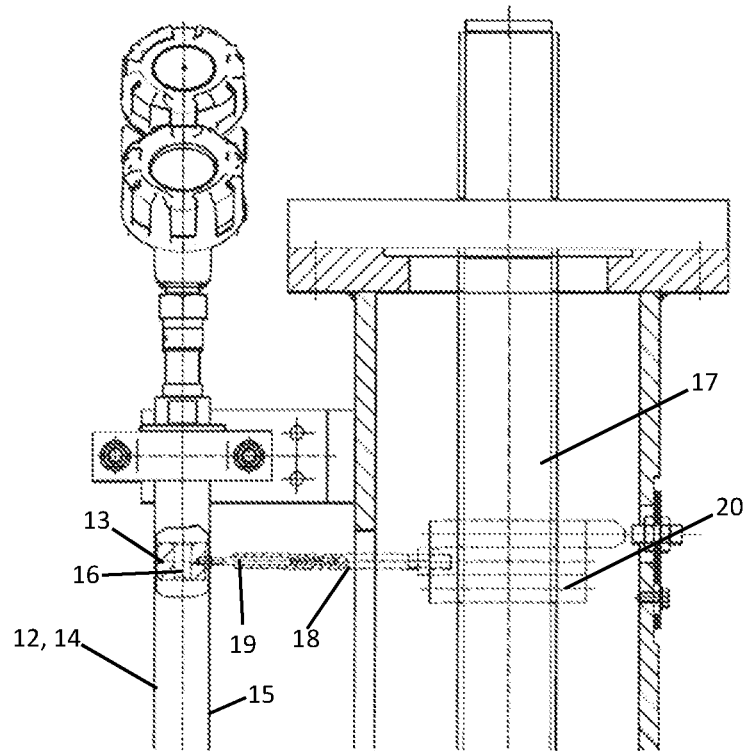

FIG. 1 a schematic representation of an exemplary embodiment of a measuring system according to the invention, which is coupled to an industrial fitting;

FIG. 2 a perspective view of the measuring system and the fitting according to FIG. 1, wherein the measuring system is shown in two different measuring positions;

FIG. 3 the lower of the two measuring positions according to FIG. 2 in detail; and FIG. 4 the upper of the two measuring positions according to FIG. 2 in detail.

The measuring system shown in FIGS. 1 to 4 can be used, for example, for gate valves, especially wedge-within-wedge gate valves, for double-plate wedge gate valves, or single-plate and double-plate control gate valves. Other forms of application in plant construction or in valves for industrial plants are possible. In general, such slide valves can be used in ethylene steam crackers, dehydrogenation plants, fluidised catalytic cracking (FCC) plants, or in delayed cokers.

The measuring system is adapted and suitable for measuring the position of a movable component 10 of the valve. The movable component 10 can be, for example, a slide valve plate (not shown) which is connected to a drive rod 17.

In the example according to FIG. 1, the drive rod 17 is designed as a spindle which drives the slide valve plate. The measuring system has a measuring device 11 for transmitting and receiving radar signals. In the example according to FIG. 1, a measuring device 11 known per se is used, which is therefore not described in greater detail. In any case, the measuring device 11 is suitable for detecting the position of a reflective element 13, which is described in greater detail below, according to the principle of time-domain reflectometry. For this purpose, the measuring device 11 is connected to a probe 12, which in the example according to FIG. 1 is designed as an outer tube 14. Other forms of the probe 12 are possible. As shown in FIG. 1, the radar signals emitted by the measuring device are coupled into the probe 12 and guided along the probe 12. In the example according to FIG. 1, the reflective element 13 is designed as a cylindrical round element that is made of an electrically conductive material, for example brass or another suitable material. The reflective element 13 can have another shape that is suitable for being guided in the probe.

The reflective element 13 is movable back and forth in the axial direction of the probe 12, as illustrated by the double arrow running parallel to the longitudinal axis of the probe at the level of the reflective element 13. The reflective element 13 can also be referred to as a sliding block or sliding element. A guide element 16 is arranged in the probe 12, or in the outer tube 14. In the example according to FIG. 1, the guide element 16 is designed as an inner tube. It is also possible to use an inner rod or another guide element. In the example according to FIG. 1, the outer tube 14 and the guide element 16 are arranged coaxially. A different arrangement is possible. The reflective element 13 has a longitudinal bore in which the guide element 16 is arranged. This allows the reflective element 13 to be moved along the guide element 16 in the probe.

For coupling the reflective element 13 to the drive rod 17, the probe 12, in particular the outer tube 14, has a lateral opening 15, which in the example according to FIG. 1 is formed as a slot. The slot extends parallel to the longitudinal axis of the probe. As shown in FIG. 1, the probe is arranged parallel to the drive rod 17, wherein the slot faces or is arranged opposite the drive rod 17.

The mechanical connection between the reflective element 13 and the drive rod 17 is made by a pin 19, which is connected to a pointer 18. The pin 19 is connected laterally to the reflective element 13 and extends through the slot. The pointer 18 is connected to an adjusting ring 20, which is arranged on the drive rod 17. When the drive rod 17 is moved in the longitudinal direction, the adjusting ring 29 is forcibly entrained. This is shown by the double arrow next to the adjusting ring 20 in FIG. 1. As can be seen further in FIG. 1, a compression spring is arranged between the pin 19 and the pointer 18.

With this arrangement, the movement, in particular rotational movement, of the spindle or, more generally, of the drive rod 17 is transmitted to the reflective element 13. This correlates the position of the slide valve plate with the position of the reflective element 13 in the probe 12.

In FIG. 1 it can further be seen that the reflective element 13 creates a contact between the outer tube 14 and the guide element 16, specifically a permanent contact. The contact ensures that the radar signals emitted by the measuring device 11 are well reflected (total reflection). The region in which the contact is created travels along the probe when the reflective element 13 moves, so that the resulting change in the travelled distance is detected for the radar signals.

FIGS. 2 to 4 show two different positions of the reflective element 13 in the probe 12. The position shown in FIG. 3 is the lower position of the adjusting ring 20 as shown in FIG. 2. By moving the drive rod 17 longitudinally, the adjusting ring 20 and thus the reflective element 13 is moved to the upper position. This shortens the path for the radar signals. The change in the propagation time of the radar signals is detected, so that the position of the reflective element 13 and thus also the position of the slide plate can be measured.

LIST OF REFERENCE SIGNS

10 Component
11 Measuring device
12 Probe
13 Reflective element
14 Outer tube
15 Opening
16 Guide element
17 Drive rod
18 Pointer
19 Pin with spring
20

The invention claimed is:

1. A system configured to measure a position of a linearly movable component of a valve comprising:
a measuring device configured to transmit and receive radar signals;
a probe connected to the measuring device and configured to guide the radar signals; and
a reflective element guided in the probe and coupled to the linearly movable component such that the position of the linearly movable component corresponds to a position of the reflective element in the probe, wherein the probe includes an outer tube in which the reflective element is guided, wherein the outer tube includes a lateral opening through which the reflective element is coupled to the linearly movable component, and wherein the reflective element is adapted to create an electrical contact with the probe.

2. The system of claim 1, wherein the lateral opening is a slot.

3. The system of claim 1, wherein the probe includes a guide element for the reflective element, wherein the guide element is configured and arranged in the outer tube and wherein the reflective element electrically connects the guide element and the outer tube to create the electrical contact.

4. The system of claim 1, wherein the probe includes a guide element for the reflective element, wherein the guide element is configured and arranged in the outer tube and wherein the reflective element has (i) an outer diameter corresponding to an inner diameter of the outer tube, and (ii) an inner diameter corresponding to an outer diameter of the guide element.

5. A measuring system configured to measure a position of a linearly movable component of an industrial valve comprising:
a measuring device configured to transmit and receive radar signals;
a probe having a guide element configured and arranged in an outer tube with a lateral opening, the probe connected to the measuring device and configured to guide the radar signals; and
a reflective element guided by the guide element in the outer tube of the probe and coupled to the movable component through the lateral opening of the outer tube such that the position of the movable component corresponds to a position of the reflective element in the probe.

6. The measuring system of claim 5, wherein the reflective element is adapted to create an electrical contact with the probe.

7. The measuring system of claim 6, wherein the reflective element electrically connects the guide element and the outer tube to create the electrical contact.

8. The measuring system of claim 5, wherein the guide element is an inner tube.

9. The measuring system of claim 5, wherein the lateral opening is a slot.

10. The measuring system of claim 5, wherein the reflective element has (i) an outer diameter corresponding to an inner diameter of the outer tube, and (ii) an inner diameter corresponding to an outer diameter of the guide element.

11. The measuring system of claim 5 wherein the measuring system is configured as a slide valve with the movable component comprising a slide valve plate having a drive rod connected to the reflective element such that movement of the slide valve plate is transmitted to the reflective element.

12. A method for measuring a position of a moveable component of a sliding valve comprising:
measuring a reflected signal corresponding to the position of the moveable component;
maintaining continuous electrical contact between a probe coupled to the moveable component and an element reflecting the signal during displacement of the moveable component, wherein the probe is guided in an outer tube, and wherein the reflective element is coupled to the linearly movable component through a lateral opening of the outer tube; and
using time domain reflectometry of the measured signal to determine the position of the movable component.

13. The method of claim 12, wherein maintaining continuous electrical contact between the probe coupled to the moveable component and the element reflecting the signal during displacement of the moveable component, further includes maintaining electrical contact between the outer tube and a guide element configured and arranged in the outer tube.

14. The method of claim 13, wherein the guide element is an inner tube.

15. The method of claim 13, wherein the reflective element has (i) an outer diameter corresponding to an inner diameter of the outer tube, and (ii) an inner diameter corresponding to an outer diameter of the guide element.

16. The method of claim 12, wherein the lateral opening is a slot.

17. The method of claim 12, wherein measuring the reflected signal corresponding to the position of the moveable component, further includes:
measuring a position of a slide valve plate having a drive rod connected to the reflective element for a slide valve such that movement of the slide valve plate is transmitted to the reflective element.

* * * * *